UNITED STATES PATENT OFFICE.

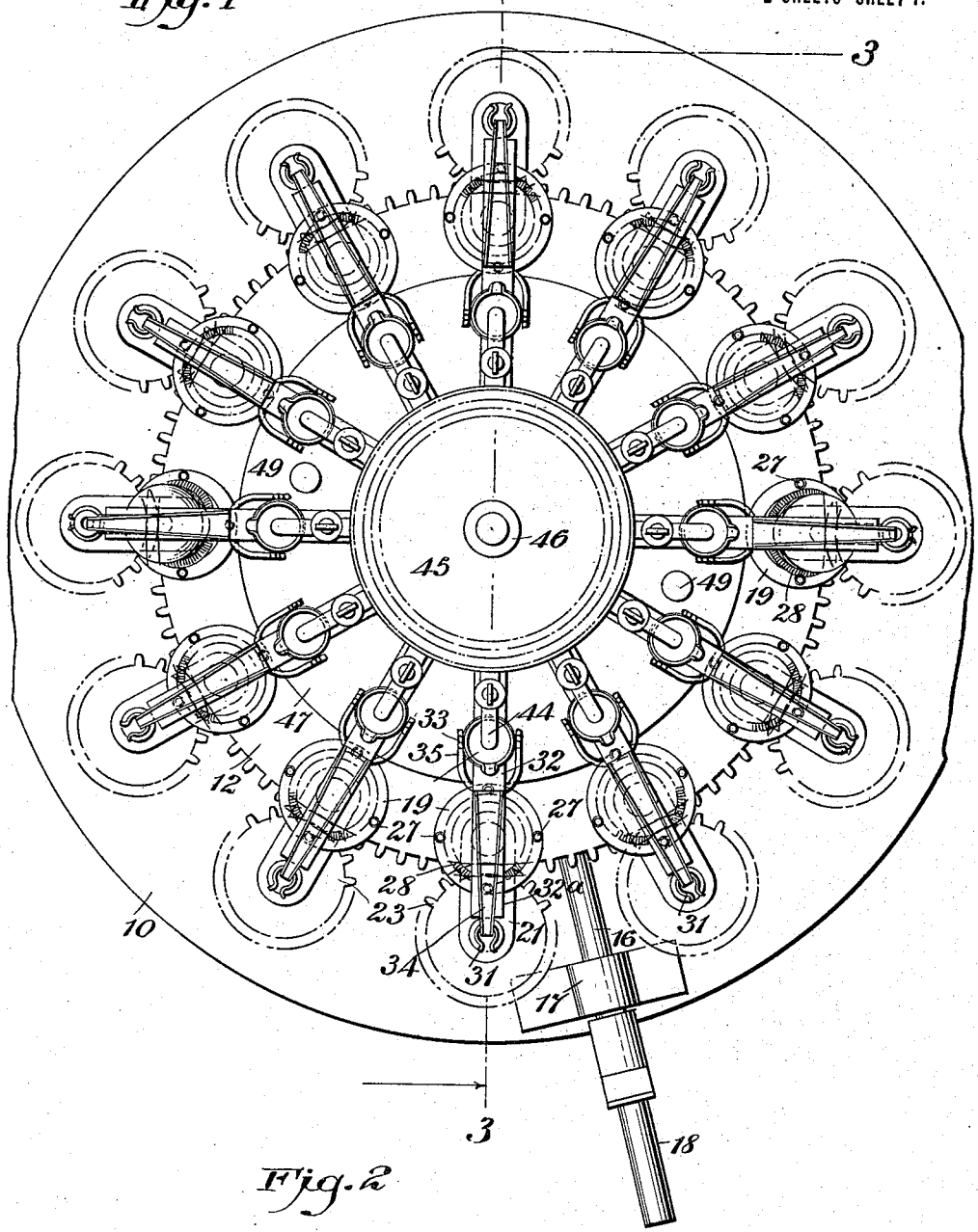
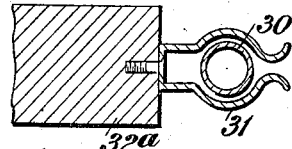

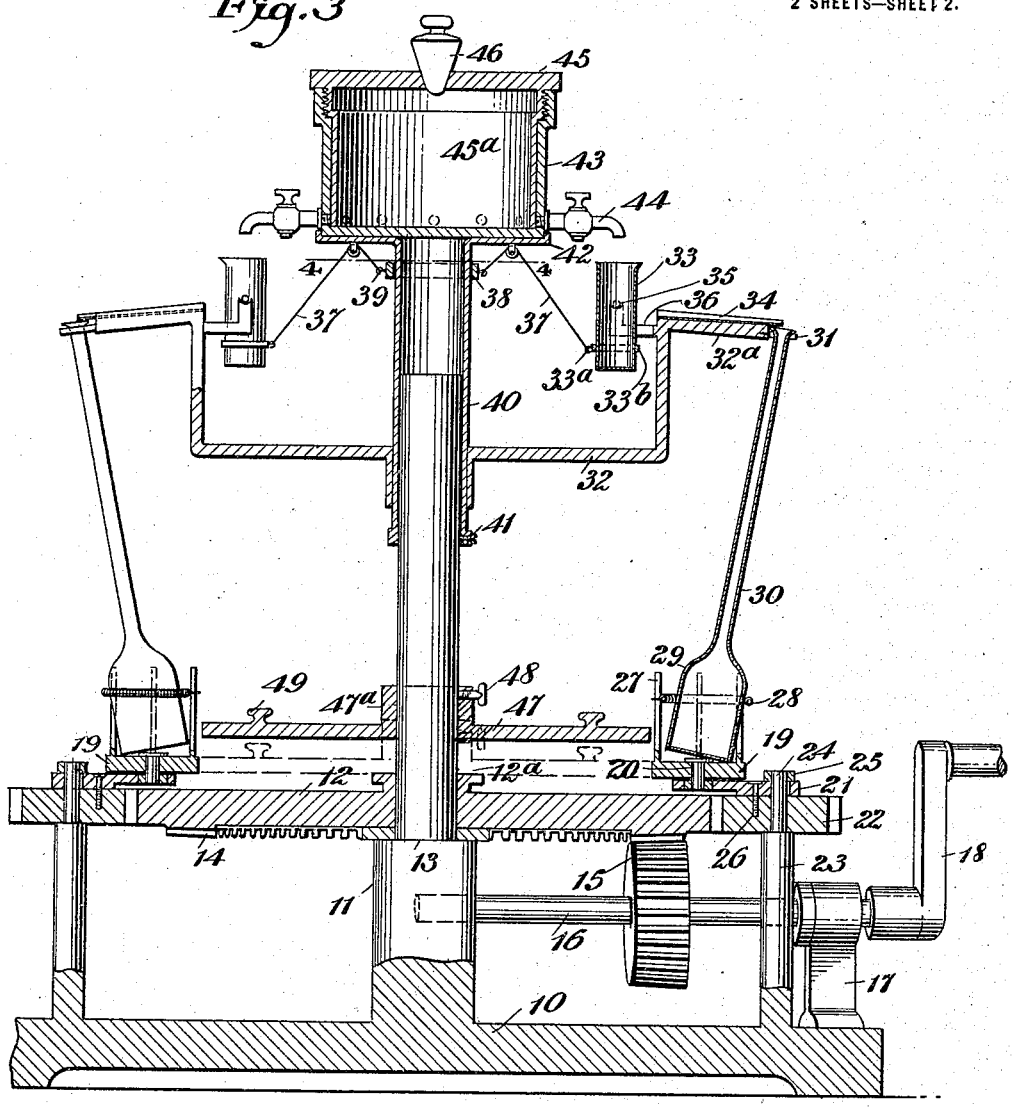

HUBERT EBE, OF PASO ROBLES, CALIFORNIA.

APPARATUS FOR PREPARING MILK OR CREAM FOR TESTING.

1,147,624.   Specification of Letters Patent.   Patented July 20, 1915.

Application filed June 29, 1914. Serial No. 847,859.

*To all whom it may concern:*

Be it known that I, HUBERT EBE, a subject of the Emperor of Germany, at present residing in Paso Robles, in the county of San Luis Obispo, State of California, United States of America, have invented a new and Improved Apparatus for Preparing Milk or Cream for Testing, of which the following is a full, clear, and exact description.
My invention relates to an apparatus for adding an acid to milk or cream for testing.

It is important that the cream or milk be gradually and cautiously mixed with the acid, and it is a prime object of my invention to provide for mechanically imparting the necessary motion to the test bottle or tube to effect the mixing in a thorough and proper manner.

It is a further object of my invention to provide an apparatus of the character described, in which a series of milk bottles will be accommodated, and receive an equal amount of acid.

Further objects of the invention are, to provide for supplying the acid in a convenient manner; and to promote convenience and efficiency in general in apparatus of the indicated character.

The invention will be particularly explained in the specific description following.

Reference is to be had to the accompanying drawings forming a part of this specification, in which similar characters of reference indicate corresponding parts in all the views.

Figure 1 is a plan view of an apparatus embodying my invention; Fig. 2 is an enlarged sectional plan view of means for holding the necks of the cream or milk bottles; Fig. 3 is a vertical section; and Fig. 4 is a detail in horizontal section on the line 4—4 of Fig. 3.

In constructing a practical embodiment of the invention as illustrated, a base or stand 10 is provided, having a standard 11 which receives a gear wheel 12, said wheel resting on a shoulder 13 of the standard 11. A pinion 15 meshes with a circular rack 14 on the under side of the gear wheel 12, for turning the latter, said pinion being mounted on a horizontal shaft 16, which may have a bearing at the inner end in the standard 11, and in a bearing 17 near the outer end, motion being imparted to the shaft in any suitable manner, as by a crank handle 18.

A series of holders 19 is provided to receive test bottles as hereinafter explained, said holders being pivotally mounted on studs 20 projecting from arms 21, which in turn are secured to an annular series of pinions 22 in mesh with the gear wheel 12. The pinions 22 turn on the reduced upper ends 24 of fixed pins 23 on the base 10, and the arms 21 may be secured on the reduced ends of the pins 23 by nuts 25, and connected with the pinions 22, to rotate with the latter by means of screws or pins 26. It will thus be seen that the holders 19 revolve about the pins 23 as an axis, and are also free to turn on their own pivots 20.

To hold the cream or milk bottles 29 in the holders 20, the latter, in the illustrated example, have upright pins 27, and around each set of pins is a resilient annulus 28, which may consist of a rubber ring or an annular spring coil.

The test bottle 29 has an elongated neck 30, the upper end of which is adapted to be held in clips 31 supported on the offset ends or arms 32$^a$ of a spider 32. It will be observed that the clips 31 for holding the upper ends of the bottle necks are out of vertical alinement with the pivots 20 of the holders 19, the said clips being closer to the center of the pins 23, so that as the holders 19 and the bodies of the bottles 20 are revolved about the pins 23, a thorough shaking will be given the bottle.

The arms 32$^a$ are formed on the upper side with acid grooves covered with acid-proof material 34, said grooves leading outwardly to a position to conduct acid to the bottle necks. On the spider 32 radially inward from the acid grooves, acid measuring receptacles 33 are provided, having trunnions 35 resting in brackets 36 at the inner ends of the arms 32$^a$. The trunnions 35 are above the horizontal center of the measuring receptacles 33, so that the center of gravity will be below the trunnions. In order to tilt all the acid receptacles 33 simultaneously, cords or other flexible elements 37 connect with hooks 33$^a$ on bands 33$^b$ secured to said receptacles, and the inner ends of said cords are connected with an annular series of hooks 39 on a collar 38, said collar having vertical sliding movement on a sleeve 40, which carries the spider 32 which is adjustably received on the upper end of the spindle 11.

I would here explain that the sleeve 40 and spider 32 are held in adjusted position at different heights by set screws 41, so that the spider may be raised or lowered to accommodate milk bottles 29 of different heights, it being understood that testing bottles for cream have longer necks than similar bottles employed for testing milk.

In order to provide for supplying acid to the various acid receptacles 33, a table 42 is formed on the upper end of the sleeve 40, and receives an acid container 43, provided near the bottom with an annular series of faucets 44, there being a faucet for each receptacle 33. If less than the total number of the acid receptacle 33 is being used, then only those faucets relating to the receptacles to be used are maintained open, the cocks of the other acid faucets being closed. A cover 45 on the acid container 43 has a depending cylindrical body 45ª, at the interior of the receptacle, and the lower edge of said cylindrical body 45 is adapted to open or close the inner ends of the faucets 44. A simple opening in the cover 45 is closed by a plug 46.

In operation, the desired complement of test bottles 29 having been secured in position, and the cocks leading to the receptacles 33 being opened, the container 43 is charged with acid by removing the plug 46. The cap 45 is then unscrewed sufficiently to permit the acid to flow through the faucets 44 to the receptacles 33, and it will be obvious that an equal quantity of acid is thus supplied to each receptacle. The sliding collar 38 is then moved downwardly on the sleeve 40, to exert a pull simultaneously on all the cords 37, whereby to tilt the acid receptacles 33, and thus pour the acid therefrom into the acid grooves 34, from which the acid will flow into the bottle necks 30. In order that the acid be caused to wash down any particles of milk or cream adhering to the necks of the bottles, it is important to agitate the bottles simultaneously with the pouring in of the acid, and for this purpose I provide an auxiliary means for manually turning the several bottle holders 29. The said additional means consists of a disk 47, the hub 47ª of which loosely fits the spindle 11 and may be made fast to said spindle by a set screw 48. Ordinarily the disk 47 is held by the set screw 48 in the position shown in full lines in Fig. 3, and will have no action. Upon the set screw 48 being loosened the disk 47 may be lowered onto the boss 12ª of gear wheel 12, in which position the said disk frictionally engages at its periphery with the several bottle supports 19 to turn the latter on their own axes only, the disk 12 and pinions 21 remaining idle. Said disk 47 is provided with knobs 49, either of which may be grasped by the operator with one hand, while with the other hand he pulls downwardly on the collar 38, for tilting the acid receptacles 33. It will thus be seen that the auxiliary actuating device 47, being directly located beneath the collar 38, the acid may be poured with perfect caution, and at the same time the desired agitating motion imparted to the bottles. The acid having been thus added, the continued and more vigorous mixing is effected by turning the shaft 16 through its crank handles 18, after which the milk can be subjected to the usual tests.

Having thus described my invention, I claim as new, and desire to secure by Letters Patent:

1. An apparatus comprising a series of bottle holders, means to simultaneously revolve the holders bodily about separate axes, relatively fixed means above each holder and approximately in line with its axis of revolution to hold the neck of a bottle, a series of receptacles mounted to tilt and supported adjacent to the respective neck-holding means, a series of members presenting grooves between the receptacles and the neck-holding means, means for simultaneously tilting the said receptacles, a container common to the several receptacles, and means on said container to discharge its contents to the several receptacles.

2. An apparatus comprising an annular series of bottle holders, means to revolve the holders bodily about separate axes, an annular series of relatively fixed neck-holding means disposed above the bottle holders and approximately in line with the axes of revolution of said holders, an annular series of receptacles adjacent to the neck-holding means, means for tilting the receptacles, and means for causing the contents of the receptacles to be poured into the bottle necks held by the said neck-holding means.

3. An apparatus comprising an annular series of bottle holders, pinions on which said holders are mounted to one side of the axes of the pinions, a gear wheel meshing with the several pinions, and means above the said bottle holders to hold the necks of bottles.

4. An apparatus comprising a series of bottle holders, means to revolve the bottle holders bodily about separate axes, and an auxiliary manually-controlled means to revolve said holders on their own axes.

5. An apparatus comprising an annular series of bottle holders, a series of pinions each mounting a bottle holder to revolve the holder bodily about the axis of the pinion, means for holding the tops of the necks of the bottles approximately coaxial with the pinions, a gear wheel meshing with the said pinions, an auxiliary manually controlled means for turning the said gear wheel, an annular series of receptacles mounted to tilt and disposed adjacent to the said neck-holding means, means to conduct a fluid from the receptacles to bottle necks held in the said neck-holding means, flexible elements connected with the said receptacles to tilt the same, and a vertically slidable operating device connected with the said flexible elements and disposed above the said auxiliary operating means for the gear wheel.

6. An apparatus comprising revolubly mounted bottle holders presenting upwardly-projecting, bottle-engaging members, and a resilient annulus on said elements.

7. An apparatus comprising an annular series of bottle holders, means for revolving said bottle holders bodily about separate axes, an annular series of receptacles above the bottle holders, said receptacles being mounted to tilt, means common to all the receptacles, for tilting the same simultaneously, and means for conducting fluid from the receptacles to points to enter bottles held on the said holders.

8. An apparatus comprising a standard, an annular series of bottle holders disposed around said standard, means for revolving said bottle holders, an annular series of tilting receptacles above the bottle holders, means for tilting said receptacles simultaneously, said means comprising a collar slidable on the said standard, and flexible elements connected with said collar and with the respective receptacles.

9. An apparatus comprising a base having a standard, an annular series of bottle holders disposed around said standard, means for imparting revoluble movement to said holders, receptacles for supplying a fluid to bottles held on said holders, means for delivering fluid from the receptacles to the bottles, and a container supported on the said standard and having means to deliver fluid to the several receptacles.

10. An apparatus comprising an annular series of bottle holders, means for revolving the holders bodily about separate axes, an annular series of means above said holders to engage the necks of the bottles, a vertically adjustable member carrying the said neck-holding means, and means for supplying fluid to the bottles held by the said bottle holders and neck-holding means.

11. An apparatus comprising an annular series of bottle holders each mounted to be turned on its own axis, means for revolving each holder bodily about a second axis and a rotatable disk with the series of holders, said disk being movable to a position to frictionally engage the bottle holders or out of operative relation to said holders.

In testimony whereof I have signed my name to this specification in the presence of two subscribing witnesses.

HUBERT EBE.

Witnesses:
W. F. SELLARS,
J. A. HOY.

Copies of this patent may be obtained for five cents each, by addressing the "Commissioner of Patents, Washington, D. C."